Patented Nov. 30, 1943

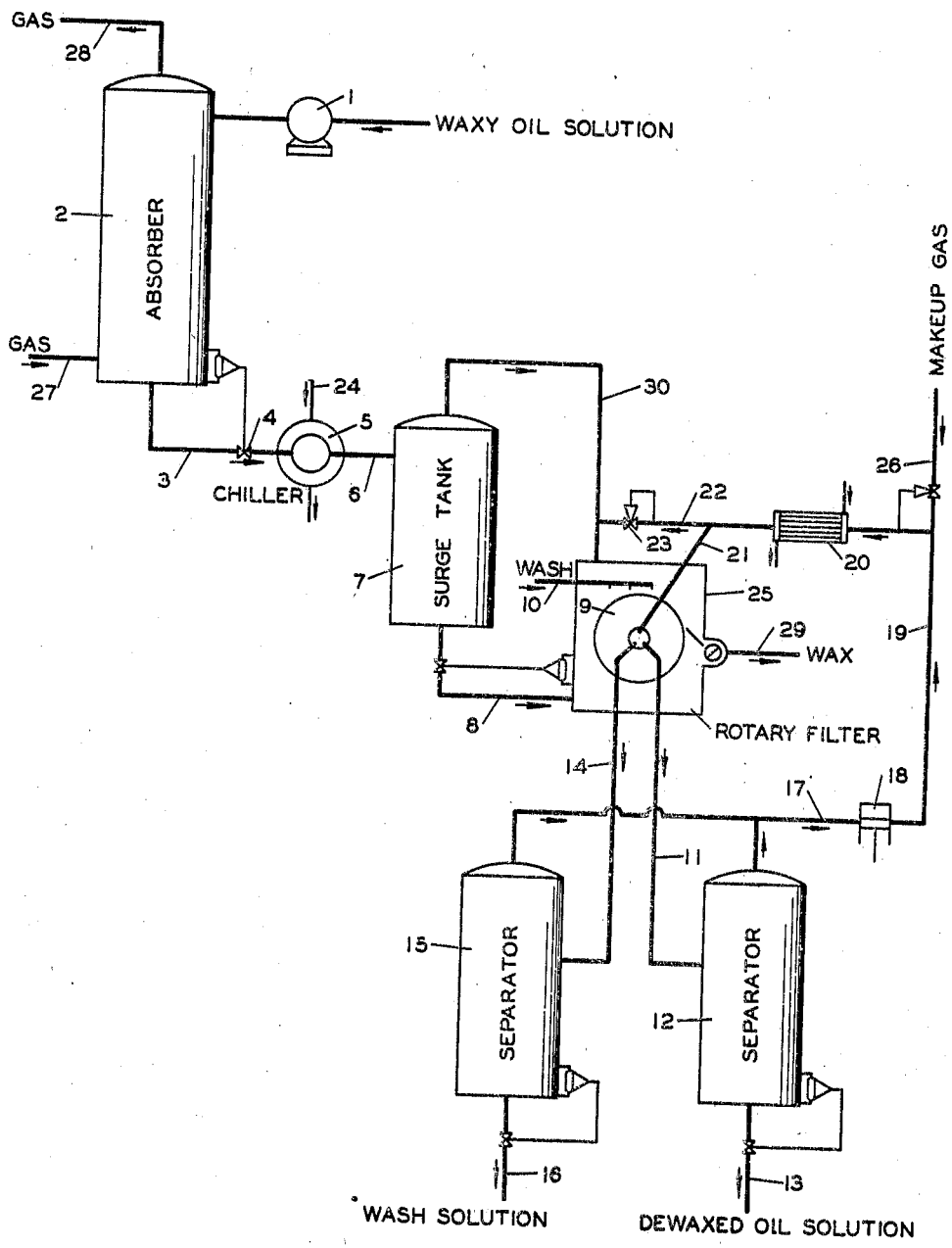

2,335,427

UNITED STATES PATENT OFFICE 2,335,427

DEWAXING LUBRICATING OILS

Shelby D. Lawson, Phillips, Tex., assignor to Phillips Petroleum Company, a corporation of Delaware Application December 21, 1940, Serial No. 371,197

4 Claims. (Cl. 196—18)

This invention relates to the dewaxing of mineral oils and more particularly it relates to an improved process employing the evolution of dissolved gases in the chilled oil-solvent mixture to assist in the separation and filtration of the precipitated wax.

It is known to the art that a waxy oil can be blended with a relatively non-viscous solvent and the mixture chilled to low temperatures to effect precipitation of the wax. This precipitated wax is then separated from the solution by various means such as cold settling, centrifuging or filtration. When this separation is made by filtration it is important that large and well defined crystals of wax be formed during the chilling operation so that the wax will not pack into an amorphous mass in the filters and hinder filtration. The large and sharply defined wax crystals form a porous screen-like mat through which filtrate may pass. Therefore, the filter rate is a function of the type of wax crystals, as well as of the viscosity of the dewaxing solution at filtration temperature.

It is also known to add free gas to wax-solvent-oil solutions in an attempt to expedite separation of the precipitated wax. In this art, the gas is injected into the chilled wax-solvent-oil and these mixtures then passed into settling vessels in which the wax-gas agglomerates and unattached gas bubbles rise to the top of the settling vessel from which the wax is to be removed. The gas added as herein given tends to cause upward rising currents and causes agitation in the settling vessels and thereby interferes seriously with the rapid and complete separation and removal of the precipitated wax.

I have found that if gas can be added to the waxy oil-solvent solution in such a manner that the gas remains in the form of very small bubbles, and if rather small but accurately controlled quantities of gas be added, upon precipitation of the wax, the gas acquires such a physical condition that occlusion of the gas by the waxy particles is a maximum, thus permitting the escape of essentially no free gas which might tend to stir and prevent settling and separation of the precipitated wax.

An object of this invention is to provide a process for the rapid separation and filtration of wax from wax-solvent-oil mixtures.

Another object of this invention is to provide a process of dewaxing in which the precipitated wax is in such a condition that filtration and solvent washing is rapid and efficient.

Still another object of this invention is to provide a process for dewaxing of lubricating oil stocks whereby some dewaxing solvents which have heretofore been uneconomical to use due to poor wax crystal formation and low filter rates may become practical when used with this process for increasing wax separation and filter rates.

Still other objects and advantages will be apparent to those skilled in the art from a careful study of the following disclosure.

I have found if gas can be added to wax-oil-solvent mixtures in such a manner that the gas particles or bubbles are exceedingly small, that these very small bubbles become rigidly attached to the precipitated wax crystals. These relatively stable agglomerates of wax and gas occupy relatively large volumes as compared to the wax crystals which contain no occluded gas. When properly prepared, these wax-gas agglomerates may be rapidly filtered from the oil-solvent solution in conventional filters. In the filter the actual volume of the wax exclusive of oil-solvent solution and gas bubbles, is relatively small, and as pressure on the filter increases the gas bubbles are removed from the filter cake leaving a porous, easily washable residual cake.

To carry out this process, I have discovered that an advantageous method of adding gas bubbles to the oil-solvent-wax mixture consists, first, in the proper selection of the gas and the solvent. The process involves the principle of the change in solubility of gases in liquids with change in temperature. Most gases are very soluble in liquids at low temperatures with the solubility decreasing as the temperature is increased. There is, however, a group of gases such as hydrogen, nitrogen, carbon monoxide, etc., or mixtures thereof, which are less soluble in many cold organic liquids than in the same organic liquids at higher temperatures. In other words, the solubility of the above-mentioned gases in these organic liquids is less at dewaxing temperatures, than at normal room temperature. Many dewaxing solvents, including oil diluents, wax antisolvents, and solubility enhancers are included in this group of organic liquids possessing said reverse gas solubility properties. My invention is based upon this principle of decreased solubility of gases in liquids with decrease in temperature.

When a dewaxing solution saturated with hydrogen or other gas or a mixture of gases possessing similar suitable solubility properties, is chilled to the dewaxing temperature a portion of the dissolved gas is released as minute bubbles or in other words, as nascent gas, as the wax is being precipitated and these minute bubbles of nascent gas therefore become occluded upon the forming wax crystals. These agglomerates of gas and wax, upon filtration, form a very porous spongy wax cake through which oil-solvent and solvent wash solutions pass more freely.

As mentioned heretofore, gases which have been found suitable for use in my dewaxing process include hydrogen, nitrogen, carbon monoxide, or mixtures thereof, and other gases possessing the property of being less soluble in dewaxing solvents at dewaxing temperatures than at higher temperatures, and in addition, such gases should not react chemically with the oil or solvent, nor be decomposed by traces of moisture, etc.

A list of the organic liquids which I have found suitable for use in my process include such as nitrobenzene, acetone, ethyl acetate, amyl acetate, benzene, toluene, aniline, etc., and such other compounds which possess the proper gas solubility relations and these other compounds, in addition, must be suitable for use in dewaxing operations, and must be inert toward the above mentioned dissolved gases.

Some petroleums and petroleum oil fractions dissolve more gas, such as hydrogen, nitrogen and carbon monoxide, at low temperature than at higher temperature. These solubility relations are the reverse of those made use of according to my invention, but I have found by using approximately three volumes or even less of solvent solution to one volume of waxy oil, that the resulting oil-solvent solution dissolves less gas at dewaxing temperatures than at atmospheric temperatures, hence upon saturating an oil-solvent mixture with, for example, hydrogen at say 120° F., then chilling this mixture to a dewaxing temperature of 0° F., an appreciable amount of hydrogen is evolved in the nascent form. In other words, the increase in gas solubility of the oil portion of the oil-solvent mixture was more than offset by the decrease in gas solubility of the solvent portion of said oil-solvent mixture, occasioned by the decrease in temperature from 120° to 0° F.

Among the advantages of my process permitting higher filter rates and more nearly complete washing of the wax cake over known methods may be mentioned:

1. Fewer filters are required for a given quantity of dewaxing solution. Filters and filter operation are expensive.

2. Solvents which have good dewaxing differentials and promote good crystal structure but are too viscous for economical filtration in present processes may become useful when a porous wax cake can be made.

3. Present dewaxing processes require a high dilution of the viscous waxy oil in order that the pressure drop through the fine pores of the wax cakes will not be excessive. By means of my invention, lower solvent to oil ratios may be used with resulting savings on auxiliary equipment as well as on chilling costs.

4. More wax surface exposed due to porosity means more efficient washing of the final wax cake. This more efficient washing permits a sharper separation between oil and wax and produces a higher yield of higher melting point wax.

The accompanying figure illustrates one method of carrying out my invention.

Referring to the figure, warm waxy oil-solvent solution at approximately 120° F. is pumped by pump 1 to the gas absorber 2 in which the oil-solvent solution passes downward and counter-current to a stream of hydrogen or other suitable gas. The gas enters the absorber through line 27 and the amount of gas absorbed by the oil-solvent mixture will be dependent upon pressure and concentration of the gas as well as upon the temperature and other conditions such as type of oil, the solvent, etc. The unabsorbed portion of the gas leaves through line 28 for recycle. The quantity of gas released per barrel of oil to be dewaxed varies with the characteristics of the oil as well as with the characteristics of the particular solvent or solvent mixture used and must be determined by experiment for optimum operating conditions.

The gas saturated solution leaves absorber 2 by way of line 3, the flow being controlled by valve 4, and enters chiller 5 which may be of the Carbondale shock chiller type or any conventional type. Refrigerant 24 circulates through the chiller as shown. In this chiller 5 by a controlled drop in temperature and pressure a definite quantity of the previously dissolved gas will be liberated from the oil-solvent solution as nascent gas. This nascent gas immediately becomes occluded upon the forming wax crystals. From the chiller the oil-solvent-wax-gas mixture passes through line 6 into surge tank 7, thence through line 8 into filter 9 in which the wax and oil-solvent mixture are separated, and the wax cake washed by chilled wash solvent from line 10. Any gas which may become freed from the precipitated wax has an opportunity to rise in the surge tank 7 and from the top thereof is conducted to the filter shell 25 by way of line 30. The filter may be any type of filter, for example, a continuous filter as given above, or a press filter, etc.

The wax free oil solution is removed from the filter through line 11 into separator 12 and thence through line 13 to the solvent recovery system, not shown. The wash solution containing oil-solvent washings from the wax cakes leaves filter 9 through line 14 and passes into separator 15, thence through line 16 to the blend tank (not shown) or to the above mentioned solvent recovery system (not shown). The gas from the separators 12 and 15 passes through line 17 to vacuum pump 18 from which the gas passes through line 19 to chiller 20 and to the filter drum through line 21. Excess refrigerated gas passes through line 22 and control valve 23 and through a portion of line 30 into the filter shell 25. In case make-up gas is needed, same may be added to the filter system through line 26. The filtered and washed wax leaves the filter at outlet 29 and passes to wax stripper (not shown).

In practicing my invention, I do not wish to be limited by any special type of wax filter or dewaxing apparatus, or flow diagram, since many modifications or variations of these may be used by those skilled in the art and yet remain within the scope of my invention.

Similarly, I do not wish to limit my invention by the above given examples of gases and dewaxing solvents, since other gas and dewaxing solvent combinations possessing the proper solubility relations, and which do not react with one another chemically, may be satisfactory within degree for use as disclosed.

I claim:

1. The process of dewaxing a waxy mineral lubricating oil which comprises substantially completely saturating under elevated pressure and at at least room temperature a solution of the waxy oil in a dewaxing solvent with a gas, said solvent possessing decreasing solubility for said gas with decreasing temperature, said solvent being employed in an amount such that said solution likewise possesses decreasing solubility for said gas with decreasing temperature, chilling the resulting saturated solution to a dewaxing temperature to effect precipitation of the wax and release of said dissolved gas in the form of nascent bubbles which gas in said form is occluded upon the forming wax crystals, and filtering the wax containing said occluded gas from the dewaxed oil solution in said solvent, said occluded gas in said wax increasing the filterability thereof.

2. The process of claim 1 wherein said gas is hydrogen.

3. The process of claim 1 wherein said gas is nitrogen.

4. The process of claim 1 wherein said gas is carbon monoxide.

SHELBY D. LAWSON.